United States Patent
Wisnudel et al.

(10) Patent No.: US 6,866,909 B2
(45) Date of Patent: Mar. 15, 2005

(54) LIMITED PLAY DATA STORAGE MEDIA AND METHOD FOR LIMITING ACCESS TO DATA THEREON

(75) Inventors: Marc Brian Wisnudel, Clifton Park, NY (US); Daniel Robert Olson, Voorheesville, NY (US); Jan Pleun Lens, Breda (NL)

(73) Assignee: General Electric Company, Niskayuna, NY (US)

( * ) Notice: Subject to any disclaimer, the term of this patent is extended or adjusted under 35 U.S.C. 154(b) by 173 days.

(21) Appl. No.: 10/233,854

(22) Filed: Sep. 4, 2002

(65) Prior Publication Data

US 2004/0043254 A1 Mar. 4, 2004

(51) Int. Cl.$^7$ ................................................ B32B 3/02
(52) U.S. Cl. ..................... 428/64.1; 428/64.8; 428/412; 430/270.12
(58) Field of Search ............................... 428/64.1, 64.4, 428/64.8, 913, 412; 430/270.12, 495.1, 945

(56) References Cited

U.S. PATENT DOCUMENTS

| | | |
|---|---|---|
| 4,906,498 A | 3/1990 | Ichikawa et al. |
| 6,343,063 B1 | 1/2002 | Rollhaus et al. |
| 2003/0002431 A1 * | 1/2003 | Breitung et al. ............ 369/288 |

FOREIGN PATENT DOCUMENTS

| | | |
|---|---|---|
| EP | 385341 | 9/1990 |
| JP | 59124891 | 7/1984 |
| JP | 2018728 | 1/1990 |
| JP | 02037539 | 2/1990 |
| WO | WO0193257 | 12/2001 |

* cited by examiner

*Primary Examiner*—Elizabeth Mulvaney
(74) *Attorney, Agent, or Firm*—Kimberly H. Parker; Patrick K. Patnode

(57) ABSTRACT

A limited play optical storage medium for data is provided in the present invention. The limited play optical storage medium for data comprises a first substrate; a reflective layer; a data layer disposed between said substrate and said reflective layer; a reactive layer comprising at least one carrier; and at least one reactive material; and an optically transparent second substrate with an oxygen permeability in a range between about 0.01 Barrers and about 1.35 Barrers at 25° C. wherein the second substrate is between the reactive layer and a laser incident surface.

31 Claims, 3 Drawing Sheets

US 6,866,909 B2

LIMITED PLAY DATA STORAGE MEDIA AND METHOD FOR LIMITING ACCESS TO DATA THEREON

BACKGROUND OF THE INVENTION

The present invention is related to storage media. More particularly, the present invention is related to limited play storage media.

Optical, magnetic and magneto-optic media are primary sources of high performance storage technology which enables high storage capacity coupled with a reasonable price per megabyte of storage. Use of optical media has become widespread in audio, video, and computer data applications in such formats as compact disc (CD), digital versatile disc (DVD) including multi-layer structures like DVD-5, DVD-9, and multi-sided formats such as DVD-10, and DVD-18, magneto-optical disc (MO), and other write-once and re-writable formats such as CD-R, CD-RW, DVD-R, DVD-RW, DVD+RW, DVD-RAM, and the like, hereinafter collectively "data storage media". In these formats, data are encoded onto a substrate into a digital data series. In pre-recorded media for optical media, such as CD, the data are typically pits and grooves formed on the surface of a plastic substrate through a method such as injection molding, stamping or the like.

In some applications, it is desirable to have a limited life for an optical disc. For example, sample computer programs are provided to potential customers in order to entice them to purchase the software. The programs are intended to be used for a limited period of time. Additionally, music and movies are currently rented for a limited time period. In each of these applications and others, when that time has expired, the disc must be returned. A need exists for machine-readable optical discs that do not need to be returned at the end of a rental period. Limited-play discs provide a solution to this problem.

Limited play discs have been produced in various fashions. One method comprised forming a disc where the reflective layer is protected with a porous layer such that the reflective layer becomes oxidized over a pre-determined period of time. Once the reflective layer attains a certain level of oxidation, the disc is no longer readable. The problem with this and other limited play techniques is that these techniques are defeatable. If the method for providing limited play to optical discs can be easily defeated by a customer or a cottage industry, discs would no longer be "limited-play". In the case of a coating or material rendering an optical disc unplayable, for example, facile removal or modification of that coating and/or material could provide a disc with unlimited playability.

There is a great desire on the part of movie studios to protect their intellectual property. Commercialization of limited-play data storage media that can be easily defeated to afford data storage media with unlimited playability would present an unacceptable risk of losing intellectual property.

SUMMARY OF THE INVENTION

The present invention provides a limited play optical storage medium for data, comprising:

a) a first substrate;
b) a reflective layer;
c) a data layer disposed between said substrate and said reflective layer;
d) a reactive layer comprising at least one carrier; and at least one reactive material; and
e) an optically transparent second substrate with an oxygen permeability in a range between about 0.01 Barrers and about 1.35 Barrers at 25° C. wherein the second substrate is between the reactive layer and a laser incident surface.

DETAILED DESCRIPTION OF THE INVENTION

Figure 1:
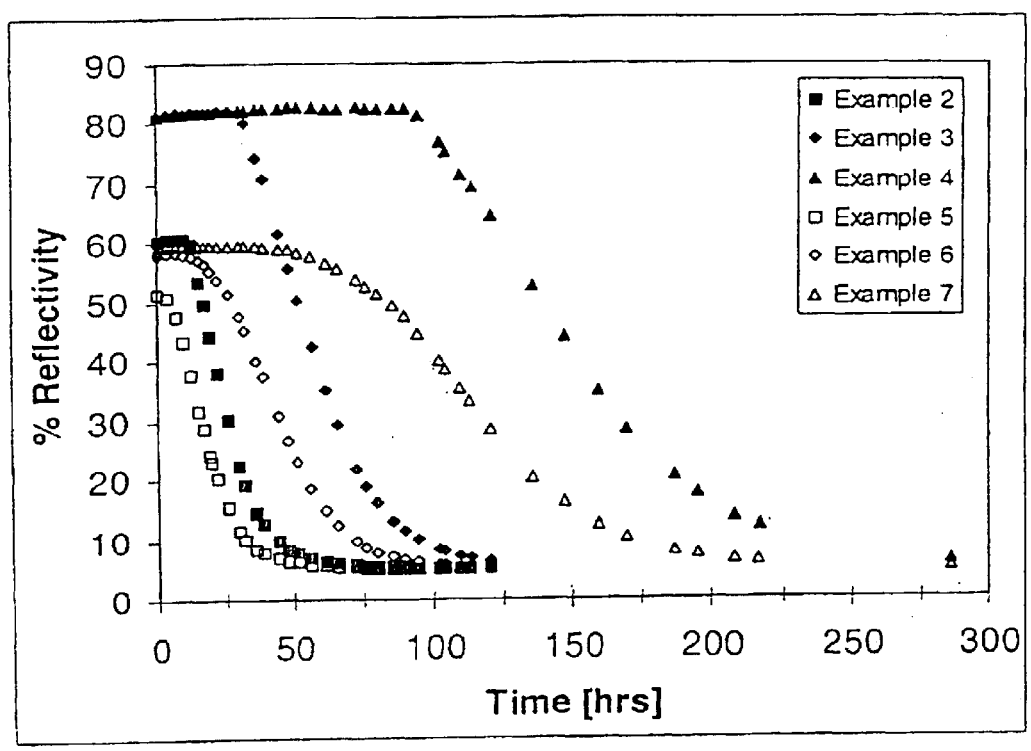
FIG. 1 depicts the reflectivity kinetics for limited-play DVDs in which the oxygen permeabilities of the unmetalized substrates are varied.

In this specification and in the claims that follow, reference will be made to a number of terms that shall be defined to have the following meaning.

The singular forms "a", "an" and "the" include plural referents unless the context clearly dictates otherwise.

"Optional" or "optionally" mean that the subsequently described event or circumstance may or may not occur, and that the description includes instances where said event or circumstance occurs and instances where it does not.

"Play-time" is defined as the total time in which the limited-play data storage medium plays generally without error in the playback device.

The play-time for a limited-play data storage medium has been found to be effectively extended through the use of an optically transparent substrate with an oxygen permeability in a range between about 0.01 Barrers and about 1.35 Barrers at 25° C. where 1 Barrer=$10^{-10}$ cm$^3$(STP) cm/cm$^2$scmHg. The optically transparent substrate is situated between the reactive layer and a laser incident surface and is referred to as the "second substrate". Upon exposure to oxygen, a reactive material, e.g., leuco methylene blue, which is essentially colorless, is oxidized to form an opaque or semi-opaque layer (e.g., the deep blue dye, methylene blue). Data storage media with the opaque/semi-opaque layer can no longer be played in media players. By adjusting the time it takes to turn opaque, the dye layer can be used to provide limited-play data storage media having the desired life for the given application. In the case in which the dye layer is initially separated from air by a second substrate with thickness of between 0.5 and 0.7 mm, the use of a substrate with an oxygen permeability in a range between about 0.01 Barrers and about 1.35 Barrers at 25° C. substantially extends the time in which the dye layer becomes opaque as compared to a data storage medium wherein a second substrate with an oxygen permeability of greater than about 1.35 Barrers is used.

The effectiveness of the second substrate in extending the time in which the dye layer becomes opaque depends in part on the rate at which oxygen can diffuse through the second substrate into the reactive dye layer. Oxygen will begin to leak through the second substrate after a lag time (Crank, *The Mathematics of Diffusion*, 2$^{nd}$ ed., Oxford University Press, 1975) approximated by $$L^2/(6D) \qquad \text{(Eq 1)}$$

where L is the thickness of the second substrate and D is the diffusion coefficient of oxygen in the second substrate. The diffusion coefficient, D, can be obtained from the permeability, P, and the solubility, S, which is typically about 6.69×10$^{-3}$ [cc]/([cc][cmHg]) for oxygen in polycarbonate (Encyclopedia of Polymer Science, vol VI, pg. 568) by D=P/S where D is in units of cm$^2$/s. In the case in which the second substrate thickness is 0.6 mm and the second substrate material is polycarbonate with an oxygen permeability of 1.39 Barrers and diffusivity of 2.1×10$^{-8}$ cm$^2$/s, the lag time is about 8 hrs. However, if the diffusivity is reduced to 0.7×10$^{-8}$ cm$^2$/s, a permeability of about 0.47 Barrers assuming that solubility is unchanged, then the lag time becomes about 24 hrs.

In some optical media formats, the thickness of the second substrate can vary from the range specified for DVD. For example, in the proposed Blue-ray video disk, the data layer is separated from air by a 100 micron film. In this case, the permeability of the film required would need to be lower to provide an adequate diffusion lag time. For example, with a 100 micron thick polycarbonate film with a permeability of 1.39 Barrers, the lag time is predicted to be 13 mm. For a film with a permeability of 0.013 Barrers, the lag time is predicted to be 24 hrs.

The data storage medium comprises the second substrate having low birefringence and high light transmittance at the read laser wavelength, i.e., is readable in an optical media device. Typically, the read laser wavelength is in a range between about 390 nanometers and about 430 nanometers (blue and blue-violet lasers) or in a range between about 630 nanometers and about 650 nanometers (red lasers). The second substrate comprises material having sufficient optical clarity, e.g., a birefringence of about ±100 nm or less, to render the data storage material readable in a media device. In theory, any plastic that exhibits these properties can be employed as the second substrate.

The data storage medium comprises the second substrate, a first substrate; a reactive layer; a data layer; and a reflective layer. The data storage medium may also further comprise a light-absorbing layer and an adhesive layer. The plastic employed for both the first substrate and second substrate should be capable of withstanding subsequent processing parameters (e.g., application of subsequent layers) such as sputtering temperatures of about room temperature (about 25° C.) up to about 150° C., and subsequent storage conditions (e.g., in a hot car having temperatures up to about 70° C.). That is, it is desirable for the plastic to have sufficient thermal and mechanical stability to prevent deformation during the various layer deposition steps as well as during storage by the end-user. Possible plastics include thermoplastics with glass transition temperatures of about 100° C. or greater, with about 125° C. or greater preferred, about 140° C. or greater more preferred, and about 200° C. or greater even more preferred (e.g., polyetherimides, polyetheretherketones, polysulfones, polyethersulfones, polyetherethersulfones, polyphenylene ethers, polyimides, polycarbonates, etc.); with materials having glass transition temperatures greater than about 250° C. more preferred, such as polyetherimide in which sulfonedianiline or oxydianiline has been substituted for m-phenylenediamine, among others, as well as polyimides, combinations comprising at least one of the foregoing plastics, and others. Generally, polycarbonates are employed.

Some possible examples of first substrate and second substrate materials include, but are not limited to, amorphous, crystalline, and semi-crystalline thermoplastic materials such as: polyvinyl chloride, polyolefins (including, but not limited to, linear and cyclic polyolefins and including polyethylene, chlorinated polyethylene, polypropylene, and the like), polyesters (including, but not limited to, polyethylene terephthalate, polybutylene terephthalate, polycyclohexylmethylene terephthalate, and the like), polyamides, polysulfones (including, but not limited to, hydrogenated polysulfones, and the like), polyimides, polyether imides, polyether sulfones, polyphenylene sulfides, polyether ketones, polyether ether ketones, ABS resins, polystyrenes (including, but not limited to, hydrogenated polystyrenes, syndiotactic and atactic polystyrenes, polycyclohexyl ethylene, styrene-co-acrylonitrile, styrene-co-maleic anhydride, and the like), polybutadiene, polyacrylates (including, but not limited to, polymethylmethacrylate (PMMA), methyl methacrylate-polyimide copolymers, and the like), polyacrylonitrile, polyacetals, polycarbonates, polyphenylene ethers (including, but not limited to, those derived from 2,6-dimethylphenol and copolymers with 2,3, 6-trimethylphenol, and the like), ethylene-vinyl acetate copolymers, polyvinyl acetate, liquid crystal polymers, ethylene-tetrafluoroethylene copolymer, aromatic polyesters, polyvinyl fluoride, polyvinylidene fluoride, polyvinylidene chloride, and tetrafluoroethylenes (e.g., Teflons).

As used herein, the terms "polycarbonate" and "polycarbonate composition" includes compositions having structural units of the formula (I):

(I)

in which at least about 60 percent of the total number of R$^1$ groups are aromatic organic radicals and the balance thereof are aliphatic, alicyclic, or aromatic radicals. Preferably, R$^1$ is an aromatic organic radical and, more preferably, a radical of the formula (II):

(II)

wherein each of A$^1$ and A$^2$ is a monocyclic divalent aryl radical and Y$^1$ is a bridging radical having zero, one, or two atoms which separate A$^1$ from A$^2$. In an exemplary embodiment, one atom separates A$^1$ from A$^2$. Illustrative, non-limiting examples of radicals of this type are —O—, —S—, —S(O)—, —S(O$_2$)—, —C(O)—, methylene, cyclohexyl-methylene, 2-[2,2,1]-bicycloheptylidene, ethylidene, isopropylidene, neopentylidene, cyclohexylidene, cyclopentadecylidene, cyclododecylidene, adamantylidene, and the like. In another embodiment, zero atoms separate A$^1$ from A$^2$, with an illustrative example being biphenol. The bridging radical Y$^1$ can be a hydrocarbon group or a saturated hydrocarbon group, for example, methylene, cyclohexylidene or isopropylidene or a heteroatom such as —O— or —S—.

Polycarbonates can be produced by the reaction of dihydroxy compounds in which only one atom separates A$^1$ and A$^2$. As used herein, the term "dihydroxy compound" includes, for example, bisphenol compounds having the general formula (III) as follows:

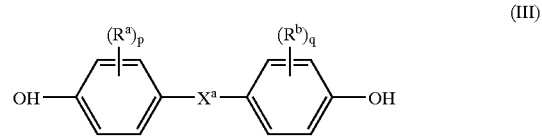

(III)

wherein R$^a$ and R$^b$ each independently represent hydrogen, a halogen atom, or a monovalent hydrocarbon group; p and q are each independently integers from 0 to 4; and $X^a$ represents one of the groups of formula (IV):

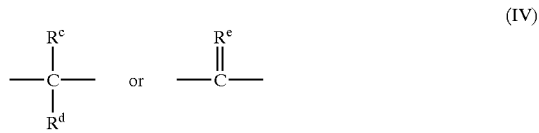
(IV)

wherein $R^c$ and $R^d$ each independently represent a hydrogen atom or a monovalent linear or cyclic hydrocarbon group, and $R^e$ is a divalent hydrocarbon group.

Some illustrative, non-limiting examples of suitable dihydroxy compounds include dihydric phenols and the dihydroxy-substituted aromatic hydrocarbons such as those disclosed by name or formula (generic or specific) in U.S. Pat. No. 4,217,438. A nonexclusive list of specific examples of the types of bisphenol compounds that may be represented by formula (III) includes the following: 1,1-bis(4-hydroxyphenyl) methane; 1,1-bis(4-hydroxyphenyl)ethane; 2,2-bis(4-hydroxyphenyl) propane (hereinafter "bisphenol A" or "BPA"); 2,2-bis(4-hydroxyphenyl) butane; 2,2-bis(4-hydroxyphenyl) octane; 1,1-bis(4-hydroxyphenyl) propane; 1,1-bis(4-hydroxyphenyl) n-butane; bis(4-hydroxyphenyl) phenylmethane; 2,2-bis(4-hydroxy-3-methylphenyl) propane (hereinafter "DMBPA"); 1,1-bis(4-hydroxy-t-butylphenyl) propane; bis(hydroxyaryl) alkanes such as 2,2-bis(4-hydroxy-3-bromophenyl) propane; 1,1-bis(4-hydroxyphenyl) cyclopentane; 9,9'-bis(4-hydroxyphenyl) fluorene; 4,4'; 9,9'-bis(4-hydroxy-3-methylphenyl) flourene; 4,4'-biphenol; and bis(hydroxyaryl) cycloalkanes such as 1,1-bis(4-hydroxyphenyl) cyclohexane and 1,1-bis(4-hydroxy-3-methylphenyl)cyclohexane (hereinafter "DMBPC" or "BCC"); and the like as well as combinations comprising at least one of the foregoing bisphenol compound.

It is also possible to employ polycarbonates resulting from the polymerization of two or more different dihydric phenols or a copolymer of a dihydric phenol with a glycol or with a hydroxy- or acid-terminated polyester or with a dibasic acid or with a hydroxy acid or with an aliphatic diacid in the event a carbonate copolymer rather than a homopolymer is desired for use. Generally, useful aliphatic diacids have carbon atoms in a range between about 2 and about 40. A preferred aliphatic diacid is dodecandioic acid.

Polyarylates and polyester-carbonate resins or their blends can also be employed. Branched polycarbonates are also useful, as well as blends of linear polycarbonates and branched polycarbonates. The branched polycarbonates may be prepared by adding a branching agent during polymerization.

These branching agents are well known and may comprise polyfunctional organic compounds containing at least three functional groups which may be hydroxyl, carboxyl, carboxylic anhydride, haloformyl, and mixtures comprising at least one of the foregoing branching agents. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl) isopropyl)benzene), tris-phenol PA (4(4(1,1-bis(p-hydroxyphenyl)-ethyl) α,α-dimethyl benzyl)phenol), 4-chloroformyl phthalic anhydride, trimesic acid, benzophenone tetracarboxylic acid, and the like, as well as combinations comprising at least one of the foregoing branching agents. The branching agents may be added at a level in a range between about 0.05 weight percent and about 2.0 weight percent, based upon the total weight of the substrate.

Examples of branching agents and procedures for making branched polycarbonates are described in U.S. Pat. Nos. 3,635,895 and 4,001,184. All types of polycarbonate end groups are herein contemplated.

Preferred polycarbonates are based on bisphenol A, in which each of $A^1$ and $A^2$ is p-phenylene and $Y^1$ is isopropylidene. Preferably, the weight average molecular weight of the polycarbonate is in a range between about 5,000 atomic mass units and about 100,000 atomic mass units, more preferably in a range between about 10,000 atomic mass units and about 65,000 atomic mass units, and most preferably in a range between about 15,000 atomic mass units and about 35,000 atomic mass units.

In monitoring and evaluating polycarbonate synthesis, it is of particular interest to determine the concentration of Fries product present in the polycarbonate. The generation of significant Fries product can lead to polymer branching, resulting in uncontrollable melt behavior. As used herein, the terms "Fries" and "Fries product" denote a repeating unit in polycarbonate having the formula (V):

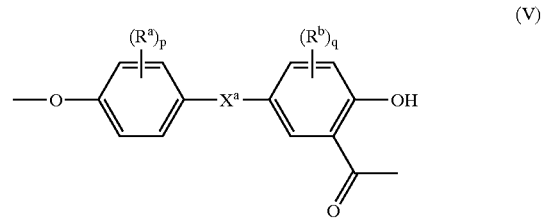
(V)

wherein $R^a$, $R^b$, p, and q are described in connection with Formula (III) and $X^a$ is a bivalent radical as described in connection with Formula (III) given above.

The polycarbonate composition may also include various additives ordinarily incorporated in resin compositions of this type. Such additives are, for example, fillers or reinforcing agents; heat stabilizers; antioxidants; light stabilizers; plasticizers; antistatic agents; mold releasing agents; additional resins; blowing agents; and the like, as well as combinations comprising at least one of the foregoing additives.

The second substrate is typically a thermoplastic as mentioned above with the proviso that the second substrate has an oxygen permeability in a range between about 0.01 Barrers and about 1.35 Barrers at 25° C. Typically, the second substrate is a polycarbonate, a polycarbonate copolymer, or a polycarbonate blend. Exemplary polycarbonates with an oxygen permeability in a range between about 0.01 Barrers and about 1.35 Barrers at 25° C. include polycarbonates comprising structural units corresponding to structures (VI) and (VII):

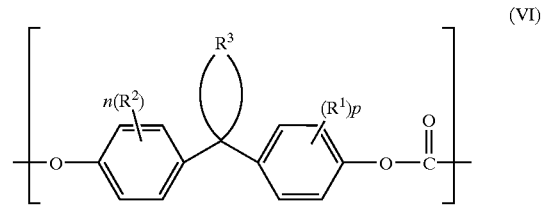
(VI)

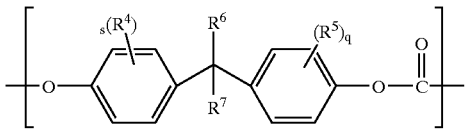

where $R^1$, $R^2$, $R^4$, and $R^5$ independently comprise a H or $C_1$–$C_6$ alkyl;

$R^3$ comprises a $C_{3-20}$ cycloaliphatic ring which is optionally substituted with halogens, $C_{1-20}$ alkyl, $C_{3-20}$ cycloalkyl, $C_{3-20}$ aryl, or fused with a $C_{3-6}$ aromatic ring;

$R^6$ and $R^7$ are independently selected from the group consisting of $C_1$–$C_6$ alkyl, phenyl, $C_1$–$C_6$ alkyl substituted phenyl, or hydrogen;

n is an integer from 1 to 4;

p is an integer from 1 to 4;

q is an integer from 1 to 4; and s is an integer from 1 to 4.

Representative units of structure (VI) include, but are not limited to, residues of 1,1-bis(4-hydroxy-3-methylphenyl)cyclohexane (DMBPC); 1,1-bis(4-hydroxy-3-methylphenyl)cyclopentane; 1,1-bis(4-hydroxy-3-methylphenyl)cycloheptane; 1,1-bis(4-hydroxy-3-methylphenyl)-3,3,5-trimethylcyclohexane (DMBPI); and fluorenylidene-9-bis(3-methyl-4-hydroxybenzene) DMBPF and mixtures thereof. Residues of DMBPC and DMBPF are most preferred as structural units (VI).

Representative units of structure (VII) include, but are not limited, to residues of 2,2-bis(4-hydroxy-3-methyl)propane (DMBPA); and 4,4'-(1-phenylethylidene)bis(2-methylphenol) (DMbisAP).

In one embodiment of the present invention, the polycarbonate comprises from about 10 to about 100 mole % of residues of DMBPC. DMBPC may be easily synthesized from cyclohexanone and ortho-cresol.

In one embodiment of the present invention, the polycarbonate comprises from about 10 to about 100 mole % of residues of DMBPA. DMBPA may be easily synthesized from acetone and ortho-cresol.

Other exemplary polycarbonates with an oxygen permeability in a range between about 0.01 Barrers and about 1.35 Barrers at 25° C. include polycarbonates comprising structural units corresponding to structures (VIII) and (IX):

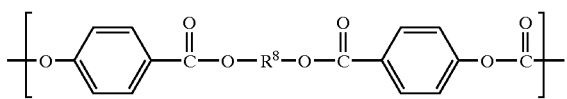

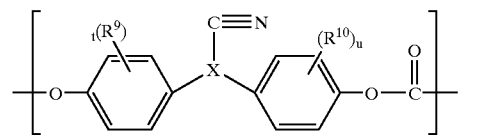

where $R^8$ is selected from divalent aliphatic hydrocarbon radicals, divalent aromatic radicals, and divalent aliphatic ether radicals;

$R^9$ and $R^{10}$ are independent monovalent hydrocarbon radicals and halogen radicals;

X is a trivalent hydrocarbon radical;

t is an integer from 0 to 4; and u is an integer from 0 to 4.

In preferred embodiments of structure (VIII), $R^8$ is a divalent alkylene, cycloalkylene, divalent alkylene ether, or a cycloalkylene ether group. The preferred alkylene groups are those containing in a range between about 1 and about 20 carbon atoms, and can be straight chain or branched alkylene groups. The preferred cycloalkylene radicals contain in a range between about 4 and about 7 ring carbon atoms. More preferably, $R^8$ is a straight chain divalent ethylene group, i.e., —$CH_2$—$CH_2$—, or a straight chain divalent butylenes group, i.e., —$CH_2$—$CH_2$—$CH_2$—$CH_2$—.

The divalent aliphatic ether groups represented by $R^8$ have the general formula

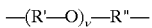

wherein R' and R" are independently alkylene or cycloalkylene groups, and v is a positive number having an average value in a range between about 1 and about 10. Preferred alkylene groups represented by R' and R" are those containing in a range between about 1 and about 20 carbon atoms, and may be branched or straight chain alkylene groups. Preferred cycloalkylene groups represented by R' and R" are those containing in a range between about 4 and about 7 ring carbon atoms. Preferably, R' and R" are both straight chain ethylene groups and v is 1.

In preferred embodiments of structure (IX), t and u are 0 or 1, and $R^9$ and $R^{10}$ are independently monovalent aliphatic radicals, preferably alkyl and cycloalkyl radicals. The preferred alkyl radicals are those containing in a range between about 1 and about 10 carbon atoms. Examples of preferred alkyl radicals include methyl, ethyl, propyl, isopropyl, butyl, tertiary butyl, pentyl and neopenthyl with methyl being most preferred. The preferred cycloalkyl radicals are those containing in a range between about 4 and about 7 ring carbon atoms. Examples of preferred cycloalkyl radicals include cyclobutyl, cyclopentyl, cyclohexyl, methylcyclohexyl, and cycloheptyl. When more than one $R^9$ and $R^{10}$ substituent is present, they may be the same or different. Preferably, $R^9$ and $R^{10}$ are both methyl groups and most preferably, the methyl groups are in the 3,3' positions of the aromatic rings with respect to X.

X preferably represents aliphatic trivalent radicals containing in a range between about 1 and about 6 carbon atoms. Most preferably, X is an aliphatic trivalent radical containing 5 carbon atoms or an aliphatic trivalent radical containing 6 carbon atoms.

In general, the aromatic rings in structure (IX) are bonded to the same carbon atom in the carbon chain represented by X and the cyano group is bonded to one of the end carbons of X.

Polycarbonate copolymers or blends with reduced permeability to oxygen may also be used. For example, monomers may be copolymerized with BPA to produce polycarbonates with reduced permeability to oxygen. Examples of monomers include, but are not limited to, aliphatic glycols, ortho-substituted bisphenols, diester bisphenols such as 4,4'-[2,2'-oxybis(ethylene-1-oxycarbonyl)]diphenol, cyano-substituted bisphenols such as 5,5'-bis(4-hydroxyphenyl)hexanenitrile, and aromatic dihydric phenols. Polymers with low oxygen permeability may also be blended with polycarbonate to lower the overall oxygen permeability of the polycarbonate blend. Examples of polymers with low permeability that could be blended include polyarylates, certain oxygen barrier grades of nylon, polyvinylacetate, polyvinylalcohol, polyvinylidene chloride, polyethylene terephthalate, and other polyesters. Additionally, the present invention includes co-polymers of structures (VI), (VII), (VIII), or (IX) with BPA to produce polycarbonates with reduced permeability to oxygen.

In the present invention, the oxygen permeability of the second substrate may also be reduced by the addition of small molecule additives blended into the polycarbonate. Examples may include antiplasticizers, pigments, mold release agents, thermal stabilizers, ultraviolet absorbers, and the like. Example of antiplasticizers that may be dispersed within the polycarbonate substrate to reduce the permeability of oxygen may include dimethyl phthalate and diphenyl phthalate (Macromolecules 27, 7041–7048, 1994) and other antiplasticizers disclosed in U.S. Pat. No. 3,386,935. Additionally, oxygen scavengers may be dispersed within the polycarbonate substrate to reduce the oxidation rate (and rate of reflectivity decrease) of the dye coating. Example of oxygen scavengers that may be dispersed within polycarbonate without adversely reducing the optical transmission may include ascorbic acid, trihydroxybenzoic acid, polyunsaturated fatty acids such as linoleic acid other oxidizable polydieneds or oxidizable polyethers, unsaturated hydrocarbons, ascorbate compounds, polyamides such as MXD6 which is a condensation polymer of m-xylylenediamine and adipic acid, and other oxidizable organic compounds. For example, see WO 01/83318, U.S. Pat. Nos. 5,049,624, 5,211,875, 5,075,372 and 5,529,833. Metal catalysts such as cobalt, copper and rhodium compounds may be used in conjunction with the oxidizable organic components in order to facilitate efficient scavenging of oxygen. Most preferred catalysts include cobalt (II) neodecanoate, N,N'-dialicylidene ethylene diamine cobalt (II) (CoSalen), and other cobalt salts.

Typically, the second substrate has a thickness in a range between about 0.5 mm and about 0.7 mm. In another embodiment of the present invention, the second substrate has a thickness in a range between about 0.05 millimeters (mm) and about 0.3 mm.

In order to aid in the processing of the first substrate material or second substrate material (e.g., the production of polycarbonate via a melt process) or to control a property of the substrate material (e.g., viscosity), catalyst(s) may also be employed. Possible catalysts include tetraalkylammonium hydroxide, tetraalkylphosphonium hydroxide, and the like, with diethyldimethylammonium hydroxide and tetrabutylphosphonium hydroxide preferred. The catalyst(s) can be employed alone or in combination with quenchers such as acids, e.g., phosphorus acid, and the like. Additionally, water may be injected into the polymer melt during compounding and removed as water vapor through a vent to remove residual volatile compounds.

Data storage media can be produced by first forming the substrate material using a conventional reaction vessel capable of adequately mixing various precursors, such as a single or twin-screw extruder, kneader, blender, or the like. The extruder should be maintained at a sufficiently high temperature to melt the substrate material precursors without causing decomposition thereof. For polycarbonate, for example, temperatures in a range between about 220° C. and about 360° C. can be used, and preferably in a range between about 260° C. and about 320° C. Similarly, the residence time in the extruder should be controlled to minimize decomposition. Residence times of up to about 2 minutes (min) or more can be employed, with up to about 1.5 min preferred, and up to about 1 min especially preferred. Prior to extrusion into the desired form (typically pellets, sheet, web, or the like), the mixture can optionally be filtered, such as by melt filtering, the use of a screen pack, or combinations thereof, or the like, to remove undesirable contaminants or decomposition products.

Once the plastic composition has been produced, it can be formed into the substrate using various molding techniques, processing techniques, or combinations thereof. Possible techniques include injection molding, film casting, extrusion, press molding, blow molding, stamping, and the like. Once the substrate has been produced, additional processing, such as electroplating, coating techniques (e.g., spin coating, spray coating, vapor deposition, screen printing, painting, dipping, and the like), lamination, sputtering, and the like, as well as combinations comprising at least one of the foregoing processing techniques, may be employed to dispose desired layers on the substrate. Typically the substrate has a thickness of up to about 600 microns.

An example of a limited play polycarbonate data storage media comprises an injection molded polycarbonate substrate. Other various layers that may be disposed on the substrate include: a data layer, a dielectric layer(s), a reactive layer(s), an adhesive layer(s), a reflective layer(s), a protective layer(s), a second substrate, a light-absorbing layer(s), as well as combinations comprising at least one of the foregoing layers.

In recordable media, the data are encoded by laser, which illuminates an active data layer that undergoes a phase change, thus producing a series of highly-reflecting or non-reflective regions making up the data stream. In these formats, a laser beam first travels through the substrate before reaching the data layer. At the data layer, the beam is either reflected or not, in accordance with the encoded data. The laser light then travels back through the substrate and into an optical detector system where the data are interpreted. Thus, the data layer is disposed between the substrate and the reflective layer. The data layer(s) for an optical application typically is pits, grooves, or combinations thereof on the substrate layer. Preferably, the data layer is embedded in the substrate surface. Typically, an injection molding-compression technique produces the substrate where a mold is filled with a molten polymer as defined herein. The mold may contain a preform, insert, etc. The polymer system is cooled and, while still in at least partially molten state, compressed to imprint the desired surface features, for example, pits and grooves, arranged in spiral concentric or other orientation onto the desired portions of the substrate, i.e., one or both sides in the desired areas.

Possible data layers for magnetic or magneto-optic applications may comprise any material capable of storing retrievable data and examples include, but are not limited to, oxides (such as silicone oxide), rare earth elements—transition metal alloys, nickel, cobalt, chromium, tantalum, platinum, terbium, gadolinium, iron, boron, others, and alloys and combinations comprising at least one of the foregoing, organic dyes (e.g., cyanine or phthalocyanine type dyes), and inorganic phase change compounds (e.g., TeSeSn, InAgSb, and the like).

The protective layer(s), which protect against dust, oils, and other contaminants, can have a thickness of greater than about 100 microns ($\mu$) to less than about 10 Angstroms (Å), with a thickness of about 300 Å or less preferred in some embodiments, and a thickness of about 100 Å or less especially preferred. The thickness of the protective layer(s) is usually determined, at least in part, by the type of read/write mechanism employed, e.g., magnetic, optic, or magneto-optic. Possible protective layers include anti-corrosive materials such as gold, silver, nitrides (e.g., silicon nitrides and aluminum nitrides, among others), carbides (e.g., silicon carbide and others), oxides (e.g., silicon dioxide and others), polymeric materials (e.g., polyacrylates or polycarbonates), carbon film (diamond, diamond-like carbon, and the like), among others, and combinations comprising at least one of the foregoing materials.

The dielectric layer(s), which are typically disposed on one or both sides of the data layer and are often employed as heat controllers, can typically have a thickness of up to or exceeding about 1,000 Å and as low as about 200 Å or less. Possible dielectric layers include nitrides (e.g., silicon nitride, aluminum nitride, and others); oxides (e.g., aluminum oxide); sulfides (e.g. zinc sulfide); carbides (e.g., silicon carbide); and combinations comprising at least one of the foregoing materials, among other materials compatible within the environment and preferably not reactive with the surrounding layers.

The reflective layer(s) should have a sufficient thickness to reflect a sufficient amount of energy (e.g., light) to enable data retrieval. Typically the reflective layer(s) can have a thickness of up to about 700 Å or so, with a thickness in a range between about 300 Å and about 600 Å generally preferred. Possible reflective layers include any material capable of reflecting the particular energy field, including metals (e.g., aluminum, silver, gold, silicon, titanium, and alloys and mixtures comprising at least one of the foregoing metals, and others).

The reactive layer, typically comprises both a polymer matrix and a reactive material. The reactive layer should initially have sufficient transmission to enable data retrieval by the data storage media device and subsequently form a layer which inhibits data retrieval by that device (e.g., which absorbs a sufficient amount of incident light, reflected light, or combinations thereof at the wavelength of the laser in the given device). Typically a layer that allows an initial percent reflectivity from the reflective layer of about 50% or greater can be employed, with an initial percent reflectivity of about 65% or greater preferred, and an initial percent reflectivity of about 75% or greater more preferred. Once the media has been exposed to oxygen, e.g., air, for a desired period of time (e.g., the desired allowable play time of the media), the layer preferably comprises a percent reflectivity of about 45% or less, with about 30% or less preferred, about 20% or less more preferred, and about less than 10% especially preferred.

The reactive material can be included in the storage medium as a coating formulation or can be included in an adhesive formulation. Examples of the reactive layer may include an oxygen sensitive dye in a PMMA coating adjacent to the reflective layer, or reactive dye in the adhesive layer between the substrate and reflective layer.

Possible reactive materials include oxygen sensitive leuco or reduced forms of methylene blue, brilliant cresyl blue, basic blue 3, and toluidine O, as well as reaction products and combinations comprising at least one of the foregoing materials; the structures of which are set forth below:

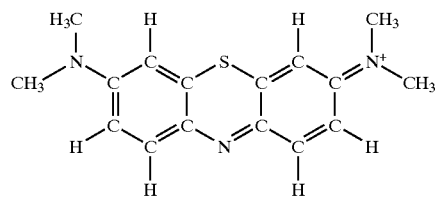

methylene blue

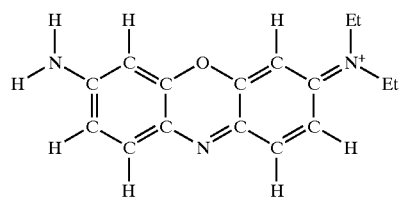

brilliant cresyl blue

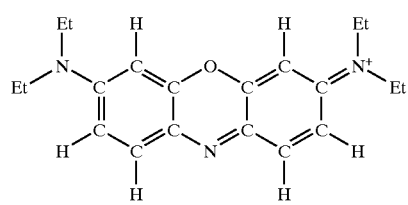

basic blue 3

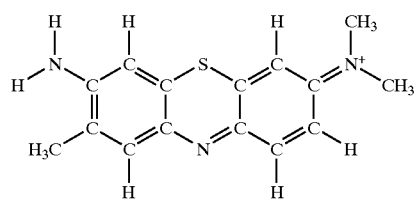

toluidine blue O

The method of synthesis and the oxygen dependent reoxidation to form the colored form of the methylene blue dye is shown below:

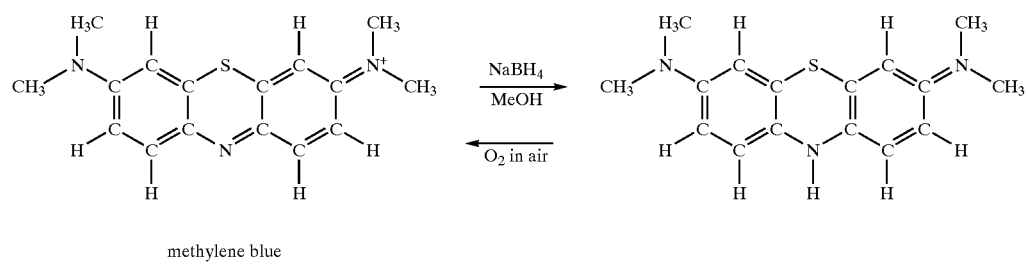

methylene blue

Typically, the critical reflectivity at which the limited play storage medium becomes playable (or unplayable) is less than about 20%, and more typically, the critical reflectivity is less than about 10%.

Additionally, the substrate may contain dyes to filter the light reaching the reactive layer. Photobleaching resistance may be improved by limiting the wavelengths of light that can be transmitted through the substrate into the reactive layer. Suitable light filtration may be obtained by incorporating dyes into the substrate such as those of the chemical family of anthraquinones, perylenes, perinones, indanthrones, quinacridones, xanthenes, oxazines, oxazolines, thioxanthenes, indigoids, thioindigoids, naphtalimides, cyanines, xanthenes, methines, lactones, coumarins, bis-benzoxaxolylthiophenes (BBOT), napthalenetetracarboxylic derivatives, monoazo and disazo pigments, triarylmethanes, aminoketones, bis(styryl) biphenyl derivatives, and the like, as well as combinations comprising at least one of the foregoing colorants. The light filtering dyes may optionally be combined with oxygen scavenging materials, additives and copolymers from structures (VI), (VII), (VIII), and (IX) that reduce oxygen permeability.

In addition to the aforementioned oxygen-sensitive leuco dyes, numerous other dyes and light blocking materials can be synthesized and incorporated into the reactive layer to operate to render the data storage media limited play. For example, some other possible reactive materials can be found in U.S. Pat. No. 4,404,257 and U.S. Pat. No. 5,815,484. The reactive materials can further comprise a mixture comprising at least one of any of the abovementioned reactive materials.

The amount of reactive material in the reactive layer is dependent upon the desired life of the data storage media. The amount of reactive material in the reactive layer can be as little as about 0.1 weight percent, with about 1 weight % preferred, based upon the total weight of the reactive layer; with an upper amount of reactive material being about 10 weight %, with about 7 weight % preferred, about 6 weight % more preferred, and about 5 weight % even more preferred.

The desired life of the data storage media depends on the rate at which the reactive material oxidizes to form the laser-light-absorbing dye. The oxidation rate depends on the concentration of reactive material (eg. leuco dye) and oxygen in the reactive layer. The concentration of oxygen in the reactive layer as a function of time after the data storage media is exposed to air depends on the permeability of oxygen through the substrate and the presence or absence of oxygen scavengers.

For example, for the oxidation of leuco methylene blue (LMB) to methylene blue (MB), the rate of oxidation can be described by the following rate equation:

$$d[MB]/dt = k_{eff}[O_2][LMB] \quad \text{(Eq. 2)}$$

where $k_{eff}$ is an effective rate coefficient which can depend upon several environmental and chemical factors including, but not limited to, temperature, pressure, acidity, and mobility of the reactants in the reactive-dye layer. The time required for oxygen to diffuse through the substrate can be approximated by Eq 1. Thus, the lower the diffusivity and permeability, the longer the diffusion lag time, and the greater the delay before the leuco dye begins to oxidize. The concentration of oxygen [$O_2$] in the reactive layer can be related back to oxygen diffusivity by solving Fick's Second Law of Diffusion subject to the appropriate boundary conditions at each layer in the media (Crank, *The Mathematics of Diffusion*, $2^{nd}$ ed., Oxford University Press, 1975). The result for the concentration of oxygen, [$O_2$], at the interface between the transparent substrate and the reactive layer for the case in which the reactive dye is in the adhesive is the following:

$$[O_2] = [O_2]_\infty \, erfc \, \{L/(4Dt)^{0.5}\} \quad \text{(Eq. 3)}$$

where erfc is the complementary error function, L is the thickness of the substrate in units of cm, and t is time in units of sec. The diffusivity of oxygen, in units of $cm^2/s$, is assumed to be constant. The concentration of oxygen in the substrate at equilibrium, [$O_2$]$_\infty$, can be taken to be the solubility of oxygen in units of mole/L.

The reactive material is preferably mixed with a carrier for deposition on, impregnation into, or a combination of deposition on and impregnation into at least a portion of the surface of the substrate to form the reactive layer. When the reactive material is included in the coating formulation, the carrier is typically present in a range between about 65% and about 85%, and more typically present in a range between about 70% and about 80%, based upon the total weight of the coating formulation. When the reactive material is included in the adhesive formulation, the carrier is typically present in a range between about 90 to 99.9%, and more typically present in a range between about 95% and about 99.5% based on the total weight of the adhesive formulation. Possible carriers comprise thermoplastic acrylic polymers, polyester resins, epoxy resins, polythiolenes, UV curable organic resins, polyurethanes, thermosettable acrylic polymers, alkyds, vinyl resins and the like, as well as combinations comprising at least one of the foregoing carriers. Polyesters include, for example, the reaction products of aliphatic dicarboxylic acids including, for example, fumaric or maleic acid with glycols, such as ethylene glycol, propylene glycol, neopentyl glycol, and the like, as well as reaction products and mixtures comprising at least one of the foregoing.

Some epoxy resins, which can be the used as the carrier, include monomeric, dimeric, oligomeric, or polymeric epoxy material containing one or a plurality of epoxy functional groups. Examples include reaction products of bisphenol-A and epichlorohydrin, epichlorohydrin with phenol-formaldehyde resins, and the like. Other organic resins can be in the form of mixtures of polyolefin and polythiols, such as shown by Kehr et al, U.S. Pat. Nos. 3,697,395 and 3,697,402.

The term thermoplastic acrylic polymers, as used herein, is meant to embrace within its scope those thermoplastic polymers resulting from the polymerization of one or more acrylic acid ester monomers as well as methacrylic acid ester monomers. These monomers are represented by the general Formula VII:

$$CH_2 = CWCOOR^f \quad \text{(VII)}$$

wherein W is hydrogen or a methyl radical and $R^f$ is an alkyl radical, preferably an alkyl radical comprising carbon atoms in a range between about 1 and about 20. Some non-limiting examples of alkyl groups represented by $R^f$ include methyl, ethyl, n-propyl, isopropyl, n-butyl, isobutyl, sec-butyl, tert-butyl, pentyl, isopentyl, hexyl, and the like.

Some non-limiting examples of acrylic acid ester monomers represented by Formula VII include: methyl acrylate, isopropyl acrylate, n-propyl acrylate, n-butyl acrylate, isobutyl acrylate, 2-ethylhexyl acrylate, and the like. Some non-limiting examples of methacrylic acid ester monomers represented by Formula VII include: methyl methacrylate, ethyl methacrylate, butyl methacrylate, hexyl methacrylate, isobutyl methacrylate, propyl methacrylate, and the like, as well as reaction products and combinations comprising at least one of the foregoing.

Copolymers of the above acrylate and methacrylate monomers are also included within the term thermoplastic acrylic polymers as it appears herein. Preferably, the thermoplastic acrylic polymer is a copolymer of poly(methyl methacrylate/methacrylic acid). The polymerization of the monomeric acrylic acid esters and methacrylic acid esters to provide the thermoplastic acrylic polymers may be accomplished by any of the known polymerization techniques. The thermoplastic acrylic polymers typically have an inherent viscosity less than about 0.300 centimeters cubed per gram ($cm^3g^{-1}$) and more typically, less than about 0.250 $cm^3g^{-1}$, and most typically, less than about 0.200 $cm^3g^{-1}$.

In order to enhance adhesion of the reactive layer to the substrate, a primer may be employed therebetween. The thermoplastic acrylic polymers useful as primers include: acrylic homopolymers derived from a single type of acrylic acid ester monomer; methacrylic homopolymers derived from a single type of methacrylic acid ester monomer; copolymers derived from two or more different acrylic acid ester monomers, two or more different methacrylic acid ester monomers, or an acrylic acid ester monomer and a methacrylic acid ester monomer; and the like, as well as combinations comprising at least one of the foregoing primers.

Mixtures of two or more of the aforedescribed thermoplastic acrylic polymers, e.g., two or more different acrylic homopolymers, two or more different acrylic copolymers, two or more different methacrylic homopolymers, two or more different methacrylic copolymers, an acrylic homopolymer and a methacrylic homopolymer, an acrylic copolymer and a methacrylic copolymer, an acrylic homopolymer and a methacrylic copolymer, and an acrylic copolymer and a methacrylic homopolymer, and reaction products thereof, can also be used.

Optionally, the reactive layer can be applied to the substrate using various coating techniques such as painting, dipping, spraying, spin coating, screen printing, inkjet printing, and the like. For example, the reactive layer can be mixed with a relatively volatile solvent, preferably an organic solvent, which is substantially inert towards the polycarbonate, i.e., will not attack and adversely affect the polycarbonate, but which is capable of dissolving the carrier. Generally the concentration of the carrier in the solvent is about 5 weight % or greater, with about 10 weight % or greater preferred, while the upper range of the polymer is about 25 weight %, with about 20 weight % or less preferred. Examples of some suitable organic solvents include ethylene glycol diacetate, butoxyethanol, methoxypropanol, the lower alkanols, and the like. Generally, the concentration of the solvent in the coating solution is about 70 weight % or greater, with about 75 weight % or greater preferred, while the upper range of the polymer is about 90 weight %, with about 85 weight % or less preferred.

The reactive layer may also optionally contain various additives such as flatting agents, surface active agents, thixotropic agents, and the like, and reaction products and combinations comprising at least one of the foregoing additives.

The thickness of the reactive layer is dependent upon the particular reactive material employed, the concentration thereof in the reactive layer, and the desired absorption characteristics of the layer both initially and after a desired period of time. When the reactive material is applied in a coating formulation, the reactive layer can have a thickness as low as about 1 micron ($\mu$), with about $2\mu$ preferred, and about $3\mu$ more preferred. On the upper end, the thickness can be up to about $15\mu$ or greater, with up to about $10\mu$ preferred, and up to about $6\mu$ more preferred. When the reactive material is applied in the adhesive, the reactive layer can be between 30 and 80 microns, and more preferably between 40 and 60 microns.

The amount of light measured at the optical head detector, $I_{initial}$, reflected off of the metalized reflective layer for an uncoated disk or limited-play disk in which the reactive layer is still in the initial, non-light-absorbing state, can be related to the intensity of the laser light incident to the optical disk, $I_o$, by the following equation: $I_{initial}/I_o=R_{initial}$. The reflectivity factor $R_{initial}$ takes into account the inherent reflectivity of the reflective layer as well as any attenuation of the light intensity due to absorption and scattering in any of the layers at time 0. At later times, after the reactive layer is exposed to oxygen, the dye absorbs light, reducing the intensity of light that is reflected back into the optical head detector. The light absorbance, A, in the reactive layer can be calculated using the Beer-Lambert Law:

$$A=-\log(I_i/I_o)=\epsilon cl \qquad (Eq\ 4)$$

where $I_i$ is the light incident to the reactive layer, $\epsilon$ is the molar extinction coefficient of the dye (about 54000 L/mole$^{-1}$cm$^{-1}$ for methylene blue at 650 nm), l is the thickness of the reactive layer, and c is the concentration of the dye which changes with time. Therefore, it can be shown that the reflectivity, R, for a limited-play disk with a light-absorbing reactive layer in which light is absorbed on both passes through the light-absorbing layer, can be approximated by the following relation:

$$R=I/I_o=R_{initial}10^{(-2\epsilon cl)} \qquad (Eq\ 5)$$

Using equation 5, one can calculate the concentration of dye and reactive layer thickness necessary to achieve a specific reflectivity. For example, in the case in which the reactive layer thickness is 3 microns, the dye is methylene blue and is present in the reactive layer at a concentration of 0.027 mole/L, and the reflectivity of the disk is 70% without the light-absorbing dye, then the predicted reflectivity of the disk with the light-absorbing dye is 10%.

Typically, the molded substrate is deaerated before the reactive layer is disposed on the substrate. Additionally, the reactants used to make the reactive layer are typically kept in an inert environment. After the storage medium has been produced, the disc is typically kept in an inert environment until the disc is ready for use. Typically, deaeration can occur with any inert gas, for example, nitrogen, argon, or helium.

An adhesive layer may also be present which can adhere any combination of the above-mentioned layers. The adhesive layer can comprise any material which is capable of forming a layer penetrable by oxygen and which does not substantially interfere with the transfer of light through the media from and to the data retrieval device (e.g., that is substantially transparent at the wavelength of light utilized by the device, and/or which allows a reflectivity from the media of about 50% or greater, with a percent reflectivity of about 65% or greater preferred and a percent reflectivity of about 75% or greater more preferred). Optionally, the adhesive layer can be the reactive layer, ie. can contain the oxygen-sensitive dye. Possible adhesive materials include UV materials such as acrylates (e.g., cross-linked acrylates, and the like) silicon hardcoats, and the like, as well as reaction products and combinations comprising at least one of the foregoing materials. Other examples of UV materials are described in U.S. Pat. Nos. 4,179,548 and 4,491,508. Some useful monoacrylate monomers include butyl acrylate, hexyl acrylate, dodecyl acrylate and the like. Some useful polyfunctional acrylate monomers include, for example, diacrylates, triacrylates, tetraacrylates, and combinations thereof.

Although the adhesive layer may contain only one of said polyfunctional acrylate monomers, or a mixture comprising at least one of the polyfunctional acrylate monomers (and the UV light reaction product thereof), preferred coating compositions contain a mixture of two polyfunctional monomers (and the UV light reaction product thereof), preferably a diacrylate and a triacrylate (and the UV light reaction product thereof), with mono-acrylate monomers used in particular instances. Optionally, the adhesive coating can comprise nonacrylic UV curable aliphatically unsaturated organic monomers in amounts up to about 50 weight % of the uncured adhesive coating that includes, for example, such materials as N-vinyl pyrrolidone, styrene, and the like, and reaction products and combinations comprising at least one of the foregoing materials.

When the adhesive layer comprises a mixture of acrylate monomers, it is preferred that the ratio, by weight, of the diacrylate to the triacrylate be in a range between about 10/90 and about 90/10. Exemplary mixtures of diacrylate and triacrylates include mixtures of hexanediol diacrylate with pentaerythritol triacrylate, hexanediol diacrylate with trimethylolpropane triacrylate, diethylene glycol diacrylate with pentaerythritol triacrylate, and diethylene glycol diacrylate with trimethylolpropane triacrylate, and the like.

The adhesive layer can also comprise a photosensitizing amount of photoinitiator, i.e., an amount effective to affect the photocure of the adhesive coating. Generally, this amount comprises about 0.01 weight %, with about 0.1 weight % preferred, up to about 10 weight %, with about 5 weight % preferred, based upon the total weight of the adhesive coating. Possible photoinitiators include blends of ketone-type and hindered amine-type materials that form suitable hard coatings upon exposure to UV radiation. It is preferable that the ratio, by weight, of the ketone compound to the hindered amine compound be in a range between about 80/20 and about 20/80. Typically, about 50/50 or about 60/40 mixtures are satisfactory.

Other possible ketone-type photoinitiators, which preferably are used in a nonoxidizing atmosphere, such as nitrogen, include: benzophenone, and other acetophenones, benzil, benzaldehyde and 0-chlorobenzaldehyde, xanthone, thioxanthone, 2-clorothioxanthone, 9,10-phenanthrenenquinone, 9,10-anthraquinone, methylbenzoin ether, ethylbenzoin ether, isopropyl benzoin ether, α,α-diethoxyacetophenone, α,α-dimethoxyacetophenone, 1-phenyl-1,2-propanediol-2-o-benzoyl oxime, α,α-dimethoxy-α-phenylacetopheone, phosphine oxides, and the like. Further included are reaction products and combinations comprising at least one of the foregoing photoinitiators.

The adhesive layer may also optionally comprise flatting agents, surface active agents, thixotropic agents, UV light stabilizers, UV absorbers and/or stabilizers such as resorcinol monobenzoate, 2-methyl resorcinol dibenzoate, and the like, as well as combinations and reaction products comprising at least one of the foregoing. The stabilizers can be present in an amount of about 0.1 weight %, preferably about 3 weight %, to about 15 weight %, based upon the weight of the uncured UV layer.

In order that those skilled in the art will be better able to practice the invention, the following examples are given by way of illustration and not by way of limitation.

EXAMPLE 1

A solution of PMMA in 1-methoxy-2-propanol was prepared by adding 60 grams of Elvacite 2010 poly (methyl methacrylate) from Ineos Acrylics to 300 grams of 1-methoxy-2-propanol in a bottle and rolling on a roller mill to effect dissolution. The solution was transferred to a flask and heated to ~80° C. while a slow stream of nitrogen was passed over the surface of the solution. The de-aerated solution was transferred using nitrogen pressure to a de-aerated bottle closed with a rubber septum using a cannula tube.

A leuco methylene blue solution was prepared by combining 1.2 grams of methylene blue trihydrate and 0.80 grams of camphor sulfonic acid with 40 grams of 1-methoxy-2propanol in a 100-mL flask equipped with a rubber septum. The stirred mixture was heated in a 90° C. water bath while a stream of nitrogen was passed into the flask using syringe needles for both the nitrogen inlet and for an outlet. While hot, 4.2 mL of Tin (II) 2-ethylhexanoate was added by syringe to reduce the methylene blue to the dark amber leuco methylene blue. To the solution was added 0.6 mL of flow additive BYK-301 from BYK Chemie. To make the PMMA/leuco methylene blue coating solution, the leuco methylene blue solution above was drawn into a syringe and then injected into the PMMA solution after having been passed through a 0.2-micron syringe filter.

EXAMPLE 2

This example illustrates the preparation of a prior art disk using a sandwich configuration. A solution was prepared as in Example 1 except the following quantitites of raw materials were used.

|  | wt (g) |
| --- | --- |
| PMMA Solution | |
| Dowanol PM [g] | 67.1 |
| Total Elvacite [g] | 15.2 |
| Elvacite 2008: | 15.2 |
| Elvacite 2010: | 0.0 |
| Dye Solution | |
| methylene blue trihydrate [g] | 0.66 |
| camphorsulfonic acid [g] | 0.28 |
| Dowanol PM [g] (5:1 ratio dowanol to d | 14.87 |
| stannous octanoate [g] | 2.85 |
| Fluorad 50% solids FC-431 [ml] | 0.15 |

The solution was used to apply a PMMA/leuco methylene blue basecoat to a 0.6 mm metalized BPA-polycarbonate DVD first substrate using a spin coater at 800 rpm for 60 seconds. The average coating thickness was found to be about 3 microns. After one of the discs with the PMMA/leuco methylene blue basecoat had been stored overnight in a nitrogen chamber, UV resin Daicure SD-640 was dispensed in a thin ring to the middle of the previously coated metalized DVD first substrate. Then, an unmetalized BPA-polycarbonate second substrate was placed on top the first substrate disk with the ring of UV resin. The sandwich was spun at 1000 rpm for 10 seconds to disperse the UV adhesive evenly. The sandwich was then passed under a flash Xenon UV lamp for 25 seconds. The sandwich was then stored in a nitrogen chamber for at least 48 hours prior to exposure to air and reflectivity kinetics measurement.

EXAMPLE 3

This example illustrates the preparation of a limited-play disk of the present invention. A limited-play disk was prepared as described in Example 2. However, an unmetalized second substrate molded from BPA/DMBPC/DDDA terpolymer (molar ratio 49:49:2) was used instead of the BPA-PC substrate of the prior art. The metalized first substrate was also molded from from the BPA/DMBPC/DDDA terpolymer. The synthesis of the terpolycarbonate is described in U.S. Pat. No. 6,395,364.

The coated discs from Examples 2 and 3 were allowed to stand at ambient room conditions during which time average % reflectivity was measured at various times using a dr. shenk PROmeteus instrument, model MT-136E. As the % reflectivity dropped the color of the disc turned from essentially colorless to blue. The reflectivity time kinetics for the limited-play DVDs prepared using the sandwich configuration using BPA-PC substrates (Example 2) and DMBPC/BPA/DDDA terpolymer substrates (Example 3) are shown in FIG. 1.

EXAMPLE 4

A limited-play disk was prepared as described in Example 2. However, an unmetalized second substrate molded from DMBPC homopolymer was used instead of the BPA-PC substrate of the prior art. The metalized first substrate was molded from BPA/DMBPC/DDDA terpolymer.

EXAMPLE 5

The dye solution used in Example 2 was used to apply a PMMA/leuco methylene blue basecoat to a 0.6 mm unmetalized BPA-polycarbonate DVD half disk using a spin coater at 800 rpm for 60 seconds. The average coating thickness was found to be about 3 microns. After one of the discs with the PMMA/leuco methylene blue basecoat had been stored overnight in a nitrogen chamber, UV resin Daicure SD-640 was dispensed in a thin ring to the middle of a metalized DVD first substrate. Then, one of the discs with the PMMA/leuco methylene blue basecoat was placed on top the first disk with the ring of UV resin. The sandwich was spun at 1000 rpm for 10 seconds to disperse the UV adhesive evenly. The sandwich was then passed under a flash Xenon UV lamp for 25 seconds. The sandwich was then stored in a nitrogen chamber for at least 48 hours.

EXAMPLE 6

A limited-play disk was prepared as described in Example 5. However, an unmetalized second substrate molded from BPA/DMBPC/DDDA terpolymer was used instead of the BPA-PC substrate. The metalized first substrate was molded from BPA-polycarbonate.

EXAMPLE 7

A limited-play disk was prepared as described in Example 5. However, an unmetalized second substrate molded from DMBPC homopolycarbonate was used instead of the BPA-PC substrate. The metalized first substrate was molded from BPA-polycarbonate. Results of reflectivity kinetics and delay kinetics for Examples 2–7 can be seen in Table 1 and FIG. 1.

TABLE 1

| Example | 2. Location of PMMA/Dye Coating | Material Used for Unmetalized Substrate | Material Used for Metalized Substrate | [%] | [hrs] | [hrs] |
|---|---|---|---|---|---|---|
| 2 | Between Metalized Substrate and Adhesive | BPA-PC | BPA-PC | 60.4 | 19 | 44 |
| 3 | Between Metalized Substrate and Adhesive | DMBPC/BPA/DDDA Terpolymer | DMBPC/BPA/DDDA Terpolymer | 81.4 | 56 | 94 |
| 4 | Between Metalized Substrate and Adhesive | DMBPC Homopolymer | DMBPC/BPA/DDDA Terpolymer | 81.4 | 147 | >150 |
| 5 | Between Adhesive and Unmetalized Substrate | BPA-PC | BPA-PC | 51.4 | 9 | 32 |
| 6 | Between Adhesive and Unmetalized Substrate | DMBPC/BPA/DDDA Terpolymer | BPA-PC | 58.0 | 32 | 72 |
| 7 | Between Adhesive and Unmetalized Substrate | DMBPC Homopolymer | BPA-PC | 59.0 | 94 | 170 |

As is evident from the data in Table 1 and FIG. 1, the use of polycarbonate substrates with lowered oxygen permeability relative to BPA-PC reduces the rate of oxidation of the reactive dye and extends the play time of the limited-play DVD. As the reflective layer, is a good barrier for oxygen diffusion, little to no oxygen permeates into the dye layer from the metalized substrate during the time scale of interest. Therefore, the rate at which the reflectivity decays is largely controlled by the permeation of oxygen through the unmetalized substrate. Comparing examples 5, 6 and 7, the use of polycarbonates with increasingly lower oxygen permeabilities delays the onset of oxidation (as indicated here by the time at which the reflectivity drops below 45%) from 9 hrs for BPA-PC, to 32 hrs for the DMBPC/BPA/DDDA-PC terpolymer, and to 94 hrs for the DMBPC-PC homopolymer. The oxygen permeabilities of these polycarbonates are 1.38, 0.36, and 0.10 Barrers, respectively (J. Applied Polym. Sci. 39, 2083–2096, 1990). A similar effect can be seen in comparing the time to 45% reflectivity for examples 2, 3, and 4. However, for these samples, the times to reach 45% reflectivity are extended by nearly a factor of 2 due to the additional barrier to oxygen diffusion provided by the adhesive layer. (The samples in examples 2, 3, and 4 were prepared with the reactive dye layer between the reflective layer and adhesive layer. Also note that the initial reflectivities for samples 3 and 4 were higher than the other samples due to an increased thickness in the reflective layer.) For the cases in which: (1) the reactive dye layer is between the unmetalized substrate and the adhesive layer, as with examples 5, 6, and 7, or (2) the dye is between the adhesive and the metalized layer, but the adhesive does not provide sufficient resistance to oxygen diffusion, or (3) the dye is in the adhesive layer, then it is especially important to use unmetalized substrates with oxygen permeabilities less than that of BPA-PC. However, the oxygen permeability should not be so slow as to cause the limited-play DVD to be playable beyond its desired target failure time. By varying the composition of the copolymer in the unmetalized substrate, it is possible to tailor the diffusion lag time as appropriate to achieve a target failure time. For example, with BPA/DMBPC copolymers the lag time can be varied from 9 hrs for BPA-PC to nearly 100 hrs for DMBPC-PC homopolymer.

EXAMPLES 8–15

A series of limited-play disks were prepared as described in Example 5. However, unmetalized second substrates molded from a variety of DMBPC- and DMBPA-polycarbonates, polycarbonate copolymers and polycarbonate blends were used instead of the BPA-PC substrate. The metalized first substrates were molded from BPA-PC. In addition, the coating solution was prepared as in Example 1 except the following quantitites of raw materials were used.

|  | wt (g) |
| --- | --- |
| PMMA Solution | |
| Dowanol PM [g] | 67.1 |
| PMMA Elvacite 2008: | 15.2 |
| Dye Solution | |
| methylene blue trihydrate [g] | 1.10 |
| biphenol | 1.52 |
| camphorsulfonic acid [g] | 0.55 |
| Dowanol PM [g] | 14.87 |
| stannous octanoate [g] | 2.38 |
| Fluorad 50% solids FC-431 [ml] | 0.15 |

Figure 2:
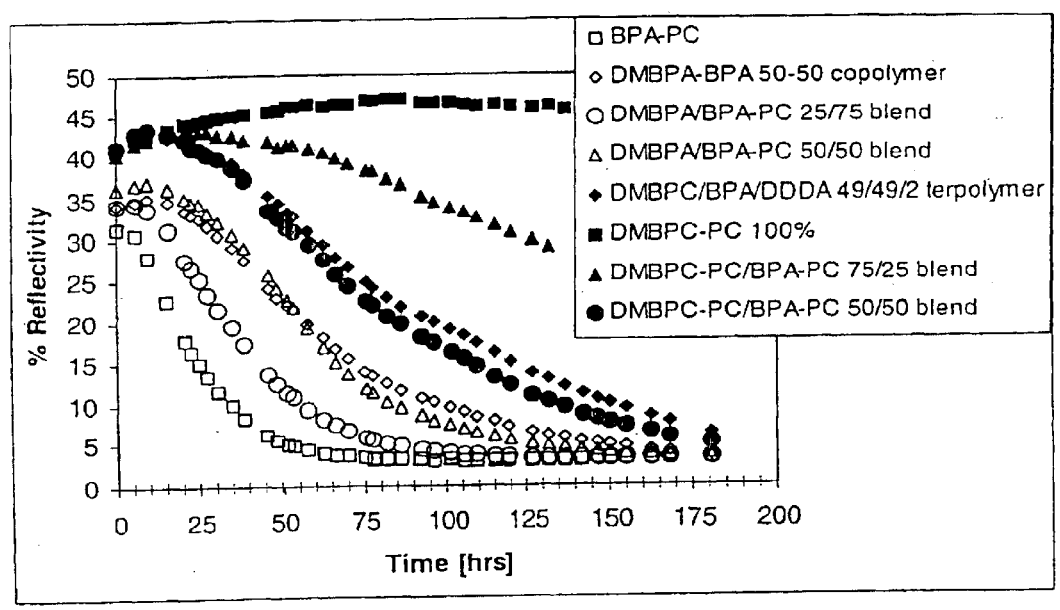
FIG. 2 depicts the reflectivity kinetics for limited-play DVDs in which the unmetalized substrate are composed of various DMBPC-polycarbonates or DMBPA-polycarbonates.

These samples, as with examples 2–7, illustrate that it is possible by varying the composition of the unmetalized substrate to tailor the diffusion lag time as appropriate to achieve a target failure time. For Examples 8–15, the time required to reach the onset of the reflectivity decay (as measured by a 10% drop in reflectivity) is tabulated in Table 2. Also tabulated are the expected failure times as measured by the time required to reach 10% reflectivity. FIG. 2 is a graphical depiction of the reflectivity kinetics for Examples 8–15.

TABLE 2

| Example | Composition | Initial Reflectivity [%] | Time to Decay Onset (10%) [hrs] | Time to R = 10% [hrs] |
| --- | --- | --- | --- | --- |
| 8 | BPA-PC | 33.1 | 9 | 38 |
| 9 | DMBPA-BPA 50—50 copolymer | 35.5 | 31 | 97 |
| 10 | DMBPA/BPA-PC 25/75 blend | 35.4 | 15 | 56 |
| 11 | DMBPA/BPA-PC 50/50 blend | 36.5 | 28 | 92 |
| 12 | DMBPC/BPA/DDDA 49/49/2 terpolymer | 41.1 | 43 | 150 |
| 13 | DMBPC-PC | 40.5 | >200 | >200 |
| 14 | DMBPC-PC/BPA-PC 75/25 blend | 40.5 | 89 | >200 |
| 15 | DMBPC-PC/BPA-PC 50/50 blend | 42 | 38 | 136 |

EXAMPLE 16

Figure 3:
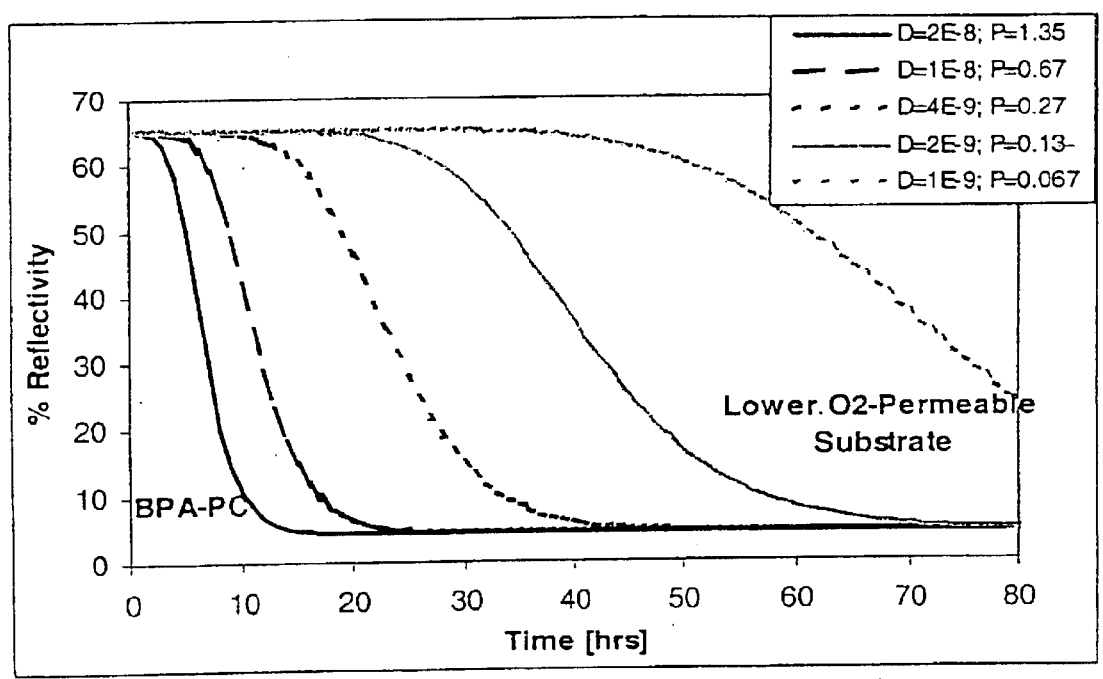
FIG. 3 depicts the predicted reflectivity kinetics for a series of limited-play DVDs in which the oxygen diffusivities of the unmetalized substrates are varied.

Equations 2–5 were solved simultaneously to predict the kinetics with which the reflectivities of limited-play DVDs decrease as the leuco dye in the reactive layer is oxidized. Parameters such as the initial concentration of leuco dye and the effective rate coefficient, $k_{eff}$, were used that best fit the reflectivity kinetics of example 5. An initial reflectivity, $R_o$, was assumed to be 65%. Boundary conditions were chosen to simulate conditions in which an infinitesimally-thin reactive layer is located between the unmetalized substrate and the adhesive layer. Under these circumstances, the concentration of oxygen in the reactive layer as oxygen diffuses through the unmetalized substrate can be predicted using equation 3. The time-dependence of reflectivity was calculated in a series of simulations in which the oxygen diffusivity in the substrate material was varied from $2 \times 10^{-8}$ cm$^2$/s to $1 \times 10^{-9}$ cm$_2$/s. A constant oxygen solubility of $6.69 \times 10^{-3}$ [cc]/([cc][cmHg]) was assumed, corresponding to a range of permeabilites from 1.35 Barrers to 0.067 Barrers, respectively. The resulting reflectivity kinetics shown in FIG. 3 for this series illustrated that a range of failure times can be designed for the limited-play DVD using compositions of unmetalized substrates with varying oxygen permeability. In FIG. 3, diffusivities (D) are in units of cm2/s and permeabilities (P) are in units of Barrers.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A limited play optical storage medium for data, comprising:
    a) a first substrate;
    b) a reflective layer;
    c) a data layer disposed between said substrate and said reflective layer;
    d) a reactive layer comprising at least one carrier; and at least one reactive material; and
    e) an optically transparent second substrate with an oxygen permeability in a range between about 0.01 Barrers and about 1.35 Barrers at 25° C. wherein the second substrate is between the reactive layer and a laser incident surface.

2. The limited play optical storage medium in accordance with claim 1, wherein the second substrate comprises a polycarbonate, a polycarbonate copolymer, or a polycarbonate blend with a glass transition temperature of at least about 100° C.

3. The limited play optical storage medium in accordance with claim 2, wherein the polycarbonate, polycarbonate copolymer, or polycarbonate blend further comprises an additive wherein the additive substantially increases the time required for oxygen to permeate through the second substrate into the reactive layer had the additive not been present.

4. The limited play optical storage medium in accordance with claim 3, wherein the additive comprises antiplasticizers, pigments, mold release agents, thermal stabilizers, ultraviolet absorbers, oxygen scavengers, or mixtures thereof.

5. The limited play optical storage medium in accordance with claim 4, wherein the additive comprises an oxygen scavenger.

6. The limited play optical storage medium in accordance with claim 5, wherein the oxygen scavenger comprises an oxidizable compound.

7. The limited play optical storage medium in accordance with claim 6, wherein the oxidizable compound comprises ascorbic acid, trihydroxybenzoic acid, linoleic acid, oxidizable polydiene, oxidizable polyether, unsaturated hydrocarbons, ascorbate compounds, polyamides, or combinations thereof.

8. The limited play optical storage medium in accordance with claim 5, wherein the polycarbonate, polycarbonate copolymer, or polycarbonate blend further comprises a metal catalyst.

9. The limited play optical storage medium in accordance with claim 8, wherein the metal catalyst comprises cobalt neodecanoate.

10. The limited play optical storage medium in accordance with claim 2, wherein the polycarbonate comprises structural units corresponding to structure (VI):

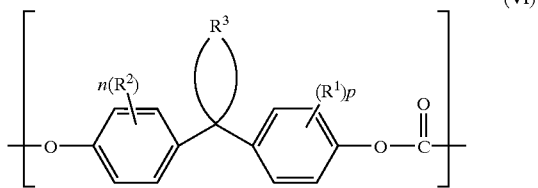

where $R^1$ and $R^2$ independently comprise a H or $C_1$–$C_6$ alkyl;

$R^3$ comprises a $C_{4-13}$ cycloalkyl group, $C_{1-6}$ alkyl-substituted aryl group, or $C_{4-13}$ aryl group which includes a fused ring system which may or may not be fused to the aryl group;

n is an integer from 1 to 4; and p is an integer from 1 to 4.

11. The limited play optical storage medium in accordance with claim 10, wherein structure (VI) comprises 1,1-bis(4-hydroxy-3-methylphenyl)cyclohexane.

12. The limited play optical storage medium in accordance with claim 10, wherein structure (VI) comprises fluorenylidene-9-bis(3-methyl-4-hydroxybenzene).

13. The limited play optical storage medium in accordance with claim 2, wherein the polycarbonate comprises structural units corresponding to structure (VII):

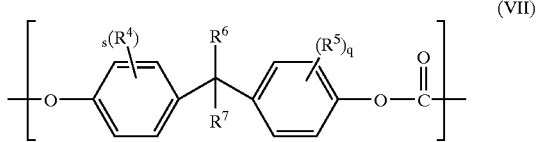

where $R^4$ and $R^5$ independently comprise a H or $C_1$–$C_6$ alkyl;

$R^6$ and $R^7$ are independently selected from the group consisting of $C_1$–$C_6$ alkyl, phenyl, $C_1$–$C_6$ alkyl substituted phenyl, or hydrogen;

q is an integer from 1 to 4; and s is an integer from 1 to 4.

14. The limited play optical storage medium in accordance with claim 13, wherein structure (VII) comprises 2,2-bis(4-hydroxy-3-methyl)propane.

15. The limited play optical storage medium in accordance with claim 2, wherein the polycarbonate comprises structural units corresponding to structure (VIII):

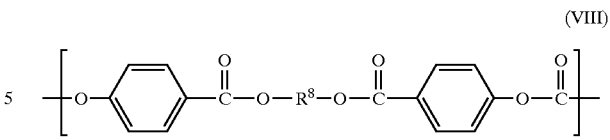

where $R^8$ is selected from divalent aliphatic hydrocarbon radicals, divalent aromatic radicals, and divalent aliphatic ether radicals.

16. The limited play optical storage medium in accordance with claim 2, wherein the polycarbonate comprises structural units corresponding to structure (IX):

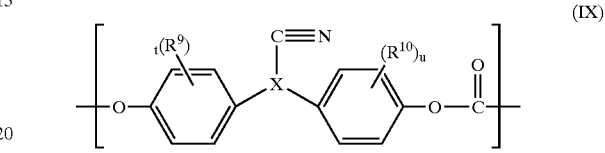

where $R^9$ and $R^{10}$ are independent monovalent hydrocarbon radicals and halogen radicals;

X is a trivalent hydrocarbon radical;

t is an integer from 0 to 4; and u is an integer from 0 to 4.

17. The limited play optical storage medium in accordance with claim 1, wherein said first substrate is plastic.

18. The limited play optical storage medium in accordance with claim 17, wherein said plastic comprises at least one thermoplastic having a glass transition temperature of about 100° C. or greater.

19. The limited play optical storage medium in accordance with claim 18, wherein said thermoplastic is selected from the group consisting of polyvinyl chloride, polyolefins, polyesters, polyamides, polysulfones, polyimides, polyetherimides, polyether sulfones, polyphenylene sulfides, polyether ketones, polyether ether ketones, ABS resins, polystyrenes, polybutadiene, polyacrylates, polyacrylonitrile, polyacetals, polycarbonates, polyphenylene ethers, ethylene-vinyl acetate copolymers, polyvinyl acetate, liquid crystal polymers, ethylene-tetrafluoroethylene copolymer, aromatic polyesters, polyvinyl fluoride, polyvinylidene fluoride, polyvinylidene chloride, tetrafluoroethylene, and mixtures, copolymers, reaction products, and composites comprising at least one of the foregoing thermoplastics.

20. The limited play optical storage medium in accordance with claim 19, wherein said thermoplastic comprises polycarbonate.

21. The limited play optical storage medium in accordance with claim 1, wherein said reactive layer comprises a material selected from the group consisting of oxygen sensitive leuco methylene blue, reduced forms of methylene blue, brilliant cresyl blue, basic blue 3, toluidine 0, and combinations comprising at least one of the foregoing reactive materials.

22. The limited play optical storage medium in accordance with claim 21, wherein said reactive layer further comprises polymethylmethacrylate/leuco methylene blue.

23. The limited play optical storage medium in accordance with claim 1, wherein said reactive layer comprises a carrier wherein said carrier is selected from the group consisting of thermoplastic acrylic polymers, polyester resins, epoxy resins, polythiolenes, UV curable organic resins, polyurethanes, thermosettable acrylic polymers, alkyds, vinyl resins, and reaction products and combinations comprising at least one of the foregoing carriers.

24. The limited play optical storage medium in accordance with claim 23, wherein said carrier comprises a thermoplastic acrylic polymer.

25. The limited play optical storage medium in accordance with claim 24, wherein said thermoplastic acrylic polymer comprises poly(methyl methacrylate/methacrylic acid).

26. The limited play optical storage medium in accordance with claim 1, wherein said reactive layer comprises a UV curable organic resin.

27. The limited play optical storage medium in accordance with claim 26, wherein the UV curable organic resin comprises cross-linked acrylic resins.

28. The limited play optical storage medium in accordance with claim 1, wherein the reflective layer comprises a metal.

29. The limited play optical storage medium in accordance with claim 28, wherein the metal comprises aluminum, silver, gold, titanium, alloys, or combinations thereof.

30. The limited play optical storage medium in accordance with claim 29, wherein the metal comprises aluminum.

31. A limited play optical storage medium for data, comprising:
  a) a first substrate;
  b) a reflective layer;
  c) a data layer disposed between said substrate and said reflective layer;
  d) a reactive layer comprising at least one carrier; and at least one reactive material; and
  e) an optically transparent second substrate comprising 1,1-bis(4-hydroxy-3-methylphenyl)cyclohexane with an oxygen permeability in a range between about 0.01 Barrers and about 1.35 Barrers at 25° C. wherein the second substrate is between the reactive layer and a laser incident surface.

* * * * *

UNITED STATES PATENT AND TRADEMARK OFFICE
CERTIFICATE OF CORRECTION

PATENT NO.    : 6,866,909 B2
DATED         : March 15, 2005
INVENTOR(S)   : Marc Brian Wisnudel It is certified that error appears in the above-identified patent and that said Letters Patent is hereby corrected as shown below:

<u>Column 20,</u>
Lines 15-32, Table 1, the headings "T@ R=45%" and "T @ R=10%", replace Table 1 with the following replacement Table 1:

Table 1

| Example | Location of PMMA/Dye Coating | Material Used for Unmetalized Substrate | Material Used for Metalized Substrate | Initial R [%] | T@R=45% [hrs] | T@R=10% [hrs] |
|---|---|---|---|---|---|---|
| 2 | Between Metalized Substrate and Adhesive | BPA-PC | BPA-PC | 60.4 | 19 | 44 |
| 3 | Between Metalized Substrate and Adhesive | DMBPC/BPA/DDDA Terpolymer | DMBPC/BPA/DDDA Terpolymer | 81.4 | 56 | 94 |
| 4 | Between Metalized Substrate and Adhesive | DMBPC Homopolymer | DMBPC/BPA/DDDA Terpolymer | 81.4 | 147 | >150 |
| 5 | Between Adhesive and Unmetalized Substrate | BPA-PC | BPA-PC | 51.4 | 9 | 32 |
| 6 | Between Adhesive and Unmetalized Substrate | DMBPC/BPA/DDDA Terpolymer | BPA-PC | 58.0 | 32 | 72 |
| 7 | Between Adhesive and Unmetalized Substrate | DMBPC Homopolymer | BPA-PC | 59.0 | 94 | 170 |

<u>Column 13,</u>
Line 55, Equation 2 should be: -- $d[MB]/dt = k_{eff}[LMB][O_2]^{0.5}$ --

Signed and Sealed this

Fifth Day of July, 2005

JON W. DUDAS
*Director of the United States Patent and Trademark Office*